March 19, 1963  C. F. HOFMANN ET AL  3,082,133

HIGH TEMPERATURE ELECTRICAL INSULATING TAPE

Filed Dec. 13, 1957

WITNESSES

INVENTORS
Charles F. Hofmann
Charles H. Vondracek
Dean C. Westervelt
BY
ATTORNEY United States Patent Office 3,082,133
Patented Mar. 19, 1963

3,082,133
HIGH TEMPERATURE ELECTRICAL INSULATING TAPE
Charles F. Hofmann, Wilkinsburg, Charles H. Vondracek, Wilkins Township, Allegheny County, and Dean C. Westervelt, Pitcairn, Pa., assignors to Westinghouse Electric Corporation, East Pittsburgh, Pa., a corporation of Pennsylvania
Filed Dec. 13, 1957, Ser. No. 702,575
2 Claims. (Cl. 154—2.6)

The present invention relates to electrical insulation and has particular reference to electrical insulating tapes having exceptionally high flexibility characteristics at room temperature and excellent electrical insulating characteristics at temperatures up to 500° C. and higher. The invention also relates to processes for producing such tapes.

In the manufacturing of electrical machinery it has been common practice heretofore to use, among other things, varnished cambric tape in those insulation applications in which it is necessary to tape around corners and about uneven surfaces such as end windings, coils and the like. Such varnished tapes constitute class A insulating materials and have a maximum operating temperature of about 105° C.

Much of the electrical machinery currently being manufactured is intended for use at class H operating temperatures of 180° C. and higher. In certain instances, electrical machinery is desired for operation at temperatures as high as 500° C. and even higher. There is, therefore, a need for an insulating tape structure which will function satisfactorily for relatively long periods of time at such elevated temperatures. To be completely satisfactory for such an application, the tape must not only withstand the relatively high temperatures involved, but it also must have good electric strength and tensile strength and have excellent flexibility characteristics at room temperature to enable its convenient application about members.

The object of the present invention is to provide electrical insulating tape comprising a fibrous inorganic backing sheet coated on at least one side thereof with a liquid suspension containing an aluminum compound, phosphoric acid, and a finely divided filler.

Another object of this invention is to provide a process for preparing an electrical insulating tape which is tacky at room temperature and which is adapted for continuous use, after application to members, at temperatures of 500° C. and higher which includes coating at least one side of a fibrous inorganic backing sheet with a liquid suspension containing an aluminum compound, phosphoric acid, and a finely divided filler.

Other and further objects of the invention will, in part, be obvious and will, in part, appear hereinafter.

For a more complete understanding of the invention, reference is made to the following description taken in conjunction with the accompanying drawing, in which.

Figure 1:
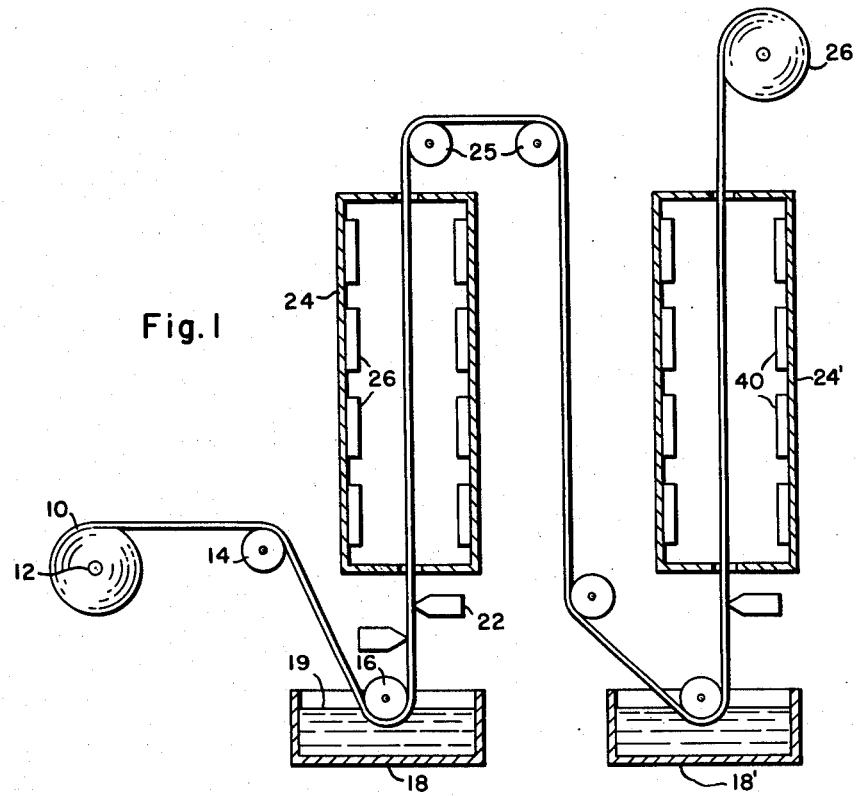
FIGURE 1 is a schematic illustration, partly in cross section, of apparatus suitable for use in preparing the high temperature insulating tape of this invention.

In the attainment of the foregoing objects and in accordance with the present invention, electrical insulating tape is prepared by coating a fibrous inorganic backing sheet on at least one side thereof with a liquid suspension comprising: (A) from 90 to 20 parts by weight of an aqueous mixture consisting of (a) from 10% to 40% by weight of aluminum phosphate, (b) from 10% to 40% by weight of phosphoric acid, and (c) the balance water, and (B) from 10 to 80 parts by weight of a solid inorganic particulate filler to be described more fully hereinbelow.

The moisture content of the coating applied to the fibrous inorganic backing sheet then is reduced to about 10% to 20% by weight whereby the coating becomes tacky. This may be achieved conveniently either by leaving the coating exposed to the air for several days or by maintaining the coating at a temperature of from 60° C. to 100° C. for a period of time, generally from one to 10 minutes. The tape then may be wound into rolls and stored.

When ready for use, the tape may be removed from the roll and wrapped about the member to be taped, for example, a conductor rod. The tacky nature of the coating enables the tape to be employed in much the same manner as one would employ a tape provided with a pressure sensitive adhesive. The tacky coating holds the tape in place when wrapping around corners and about uneven surfaces. After the member has been wrapped, it is cured by baking at from 200° C. to 300° C. until the tacky coating has been heat converted to hard, tough bond uniting the tape and member into unitary insulated assemblage.

The phosphates employed in accordance with this invention are those known as aluminum phosphates. As used in the instant specification and in the appended claims, the term "aluminum phosphates" refers not only to aluminum phosphate, $AlPO_4$, but also to aluminum mono-hydrogen phosphate, $Al_2(HPO_4)_3$, as well as to aluminum mono-hydrogen phosphate, $Al(H_2PO_4)_3$, as well as to mixtures of two or more of these.

The aluminum phosphate is employed in the aqueous mixture (A) portion of the herein described liquid coating suspension in amounts within the range of about 10% to 40% by weight, with amounts within the range of about 18% to 23% by weight being preferred.

The phosphoric acid employed in accordance with the present invention includes not only ortho-phosphoric acid of the formula $H_3PO_4$ (85%) but also pyro-phosphoric acid having the formula $H_4P_2O_7$ as well as meta-phosphoric acid having the formula $HPO_3$. The latter two acids revert to the ortho-phosphoric form when they are employed in water.

The term "phosphoric acid" as employed in the instant specification and in the present claims includes meta- and pyro-phosphoric acids as well as ortho-phosphoric acid. Phosphoric acid is employed with the aluminum phosphate in the aqueous mixture (A) portion of the herein-described liquid coating suspension in amounts within the range of about 10% to 40% by weight, preferably in a range of about 27% to 31% by weight of mixture (A).

Satisfactory electrical insulating tapes suitable for use at temperature of 500° C. and higher are not obtained when the fibrous material is coated only with an aqueous mixture of aluminum phosphate and phosphoric acid. It is essential that a solid inorganic particulate filler be incorporated in the composition as well. The importance of the presence of the filler is demonstrated by the fact that the tape will crack during or after the final cure if the inorganic filler is not present therein. The tape has poor thermal shock resistance and poor mechanical impact resistance. Moreover, in the absence of the inorganic filler, the insulating tape becomes so moisture sensitive that it, in fact, absorbs water whereby the bond between the tape and the electrical conductor is destroyed with the result that the coating crumbles and the tape comes loose from the conductor thereby impairing almost completely the insulating characteristics of the tape.

Inorganic fillers which have been found to be particularly suitable for use in accordance with this invention include compounds selected from the group consisting of the oxides and silicates of metals selected from the group consisting of calcium, magnesium, cadmium, aluminum, zinc, lead and titanium. These filler compounds may be used singly or in mixtures of any two or more. The filler may be employed in combination with the other components in forming the liquid coating suspension in amounts within the range of from 10 to 80 parts by weight. The particles should have an average size of between 5 and 150 microns, preferably from 5 to 75 microns.

One process for making the electrical insulating tape of this invention is illustrated schematically in FIG. 1 of the drawing. As illustrated, reference numeral 10 refers to a roll of inorganic fibrous material mounted on a roller 12. The fibrous material may comprise glass cloth, glass paper, glass mat, asbestos cloth, asbestos paper, asbestos mat, quartz paper, quartz mat, and the like.

The fibrous material 10 is converted into high temperature electrical insulating tape in accordance with this invention by first passing it over roller 14 and under roller 16 into a tank 18 wherein it is coated uniformly on one or both sides thereof with a liquid coating suspension 19 containing, for example, 15% by weight of aluminum phosphate, 21% by weight of phosphoric acid, and 36% by weight of water in which is suspended a filler composed of 14% by weight of calcium silicate and 14% by weight of aluminum oxide, each filler compound having an average particle size of from 10 to 15 microns.

Upon leaving tank 18, the coated fibrous material is passed over a series of scaper bars 22 which force the mixture 19 into the interstices of the fibrous material and remove any trapped air bubbles from the aqueous coating. The coated fibrous material then is passed through an oven 24 provided with heating elements 26 wherein a temperature is maintained which is suitable for reducing the moisture content of the coating to about 10% to 20% by weight whereby it becomes tacky. In practice, it has been determined that this result may be secured conveniently by heating the coating to a temperature in the range of from 60° C. to 100° C. for a period of from about one to ten minutes depending upon the thickness of the coating.

If desired, the fibrous material thus treated may be passed over rollers 25 into a succession of additional treating tanks 18' and ovens 24' to deposit progressively thicker coatings of the mixture 19 thereupon. Particularly satisfactory results have been obtained when the binder coating is deposited in thicknesses varying within the range of from 0.001 inch to 0.015 inch.

Upon leaving the final drying tower, the fibrous material with its tacky coating then is wound on a take-up roller 26. It is preferred to wind the finished tape onto rolls with separator sheets of polyethylene or ethylene glycol terephthalate to prevent the rolled tape from sticking.

Figure 2:
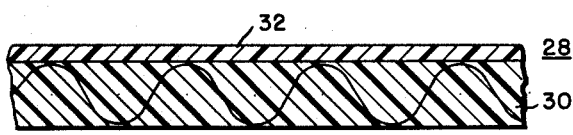
FIG. 2 is a greatly enlarged view, in cross section of electrical insulating tape prepared in accordance with this invention.

Looking next at FIG. 2 of the drawing, there is illustrated a length of tape 28 prepared in accordance with this invention. As illustrated, the sheet fabric material 30 is shown with a tacky coating 32 deposited on one side thereof. It will be understood, of course, that it is within the scope of this invention to have a coating 32 on both sides of fabric 30.

Figure 3:
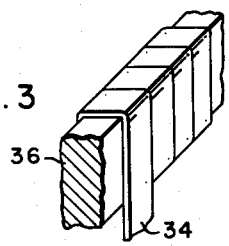
FIG. 3 is a side view illustrating a portion of an electrical conductor member insulated with the tape of this invention.

The tape thus prepared may be stored indefinitely. As illustrated in FIG. 3, when ready for use, the tape 34 is wound about an electrical conductor 36 or other members and cured whereby it is ready for use in the building of transformers, motors, solenoids, and other electrical equipment. Heating of the wound electrical member to a temperature of from 200° C. to 300° C. for about 3 to 5 minutes results in the development of a fully-cured electrical insulated member suitable for satisfactory continuous operation at temperatures of 500° C. for prolonged periods of time.

In order to indicate even more fully the advantages and capabilities of the present invention, the following specific examples are set forth. The percentages and parts given are by weight unless otherwise indicated.

*Example I*

A strip of glass cloth one inch wide was passed through a liquid suspension containing 50 parts of calcium silicate having an average particle size of about 50 microns and 50% by weight of an aqueous mixture containing 20% of aluminum phosphate, 20% of orthophosphoric acid and the balance water. The coated cloth then was passed through an oven maintained at a temperature of about 80° C. The tape was passed through the oven at a rate such that the moisture content of the coating was reduced to about 15% whereby it became tacky. This tacky tape when wrapped about a conductor was cured to solid insulation by heating to 250° C. for 5 minutes. The insulated conductor is suitable for use in an electrical machine operating at temperature of 500° C.

*Example II*

Electrical insulating tape is prepared by passing asbestos paper through a liquid suspension comprising (A) 40 parts of an aqueous mixture containing (a) 15% of aluminum di-hydrogen phosphate and (b) 15% of pyrophosphoric acid, and (c) 70% water, and (B) 60 parts of a finely divided filler made up of equal weights of magnesium oxide and aluminum silicate. The pyrophosphoric acid converted to the ortho form when admixed with the water. The coated tape is passed through an oven maintained at a temperature of about 90° C. at a rate whereby the moisture content of the coating is reduced to about 10%. The coating then is tacky to the touch. This tape is suitable for wrapping about electrical conductors. When heated to 250° C. for about 5 minutes, the tacky coating is converted to a hard product which binds the tape tightly to the conductor. The conductor may be exposed to temperatures as high as 500° C. for long periods of time.

Equally satisfactory results are obtained by substituting equal weights of cadmium oxide and zinc oxide for the fillers used in Example III.

The tapes of this invention, in addition to providing excellent electrical insulation, also are suitable for use in securing electrical components and like structures in predetermined locations in electrical and other apparatus. Thus, the tape may be used on coils to locate the terminals in place.

Moreover, fillers other than the oxides and silicates disclosed hereinabove may be incorporated in amounts up to about 30%. Pigments and dyes may be added as desired. Examples of such fillers include mica, iron oxide, silica, and the like. These fillers should be used in finely divided form and they may be used singly or in combinations of two or more.

The following example illustrates the preparation of a tape suitable for use in both insulating an electrical coil and in maintaining its terminals in position.

*Example III*

A length of glass mat was coated with a liquid suspension composed of 60 parts of a finely divided filler and 40 parts of an aqueous coating mixture. The filler was composed of equal parts of aluminum oxide and silica and the aqueous coating mixture was composed of 35% aluminum phosphate, 10% phosphoric acid, and 55% water.

The tape is allowed to drain to remove excess coating material therefrom and then air dried for several hours until the coating became tacky. The resulting tape was wrapped around a coil to maintain the terminals in position and around the windings as an outer protective layer. After curing of the coating at 275° C., the coil could be operated satisfactorily at temperatures as high as 500° C., with the terminals being held in the desired position.

While the present invention has been described with reference to what is at present considered to be preferred embodiments thereof, it will be understood, of course, that certain changes, modifications, substitutions and the like may be made therein without departing from the true scope.

We claim as our invention:

1. An electrical insulating tape adapted for use at temperatures as high as 500° C., said tape having been derived by coating a fibrous inorganic backing sheet on at least one side thereof with a liquid suspension comprising, (A) from 90 to 20 parts by weight of an aqueous mixture consisting of (a) from 10% to 40% by weight of aluminum phosphate, (b) from 10% to 40% by weight of phosphoric acid, and (c) the balance water, and (B) from 10 to 80 parts by weight of a solid inorganic particulate filler comprising oxides and silicates of metals selected from the group consisting of calcium, magnesium, cadmium, aluminum, zinc, lead, and titanium, and drying the applied coating by maintaining it at a temperature of from 60° C. to 100° C. for a period of time sufficient to reduce the moisture content of the coating to about 10% to 20% by weight whereby it becomes tacky.

2. A tape derived by coating a fibrous inorganic backing sheet on at least one side thereof, with a liquid suspension comprising (A) from 90 to 20 parts by weight of an aqueous mixture consisting of (a) from 10% to 40% by weight of aluminum phosphate, (b) from 10% to 40% by weight of phosphoric acid, and (c) the balance water, and (B) from 10 to 80 parts by weight of a solid inorganic particulate filler comprising oxides and silicates of metals selected from the group consisting of calcium, magnesium, cadmium, aluminum, zinc, lead and titanium, and reducing the moisture content of the applied coating to about 10% to 20% by weight whereby the coating becomes tacky.

References Cited in the file of this patent

UNITED STATES PATENTS

| | | |
|---|---|---|
| 1,773,105 | Jones et al. | Aug. 19, 1930 |
| 2,161,290 | Grimm et al. | June 6, 1939 |
| 2,444,347 | Greger | June 29, 1948 |
| 2,610,957 | Steinman | Sept. 16, 1952 |
| 2,675,421 | Dexter | Apr. 13, 1954 |
| 2,789,155 | Marshall et al. | Apr. 16, 1957 |